United States Patent [19]
McDonald et al.

[11] Patent Number: 5,347,556
[45] Date of Patent: Sep. 13, 1994

[54] CORIUM SHIELD

[75] Inventors: Douglas B. McDonald, Pleasanton; Carol E. Buchholz, San Jose, both of Calif.

[73] Assignee: General Electric Company, San Jose, Calif.

[21] Appl. No.: 84,113

[22] Filed: Jul. 1, 1993

[51] Int. Cl.⁵ .............................................. G21C 9/016
[52] U.S. Cl. .................................................. 376/280
[58] Field of Search .............. 376/280; 976/DIG. 143

[56] References Cited

PUBLICATIONS

Buchholz, (G.E. Nuclear Energy), "Corium Protection for Lower Drywell Sump", Aug. 7, 1992, Cover Letter and Attachment 7B, pp. 7B1–7B22, report to Nuclear Regulatory Commission.

Westinghouse, "Simplified Passive Advanced Light Water Reactor Plant Program, AP600 Probabilistic Risk Assessment", Jun. 26, 1992, 3 cover pages and p. 10–4, report to U.S. Department of Energy.

G.E. Nuclear Energy, "ABWR Advanced Boiling Water Reactor Standard Safety Analysis Report", cover page and pp. 19EB.2–3, 2–6, and 7.1, report to Nuclear Energy Commission in Jan. 1993.

Primary Examiner—Daniel D. Wasil
Attorney, Agent, or Firm—J. S. Beulick

[57] ABSTRACT

A shield for restricting molten corium from flowing into a water sump disposed in a floor of a containment vessel includes upper and lower walls which extend vertically upwardly and downwardly from the floor for laterally bounding the sump. The upper wall includes a plurality of laterally spaced apart flow channels extending horizontally therethrough, with each channel having a bottom disposed coextensively with the floor for channeling water therefrom into the sump. Each channel has a height and a length predeterminedly selected for allowing heat from the molten corium to dissipate through the upper and lower walls as it flows therethrough for solidifying the molten corium therein to prevent accumulation thereof in the sump.

20 Claims, 3 Drawing Sheets

5,347,556

CORIUM SHIELD

The U.S. Government has rights in this invention in accordance with Department of the Energy Contract No. DE-AC03-86SF16563.

The present invention relates generally to nuclear reactors, and, more specifically, to a shield for restricting molten corium from flowing into water sumps in a lower drywell below a reactor pressure vessel.

BACKGROUND OF THE INVENTION

An exemplary nuclear reactor, such as a boiling water reactor (BWR), includes a reactor core disposed in a reactor pressure vessel, with the pressure vessel being in turn disposed in a containment vessel. The reactor core includes a plurality of nuclear fuel rods configured in bundles to generate heat which is transferred to water recirculating therein for generating steam to power a steam turbine-generator, for example.

Reactivity in the core is typically controlled by a plurality of control rods typically extending vertically upwardly therein from the bottom of the pressure vessel. Conventional control rod drives (CRDs) are mounted below the pressure vessel in a lower drywell region of the containment vessel for selectively inserting the control rods into the core and withdrawing the control rods therefrom for controlling reactivity. The lower drywell is defined by an annular pedestal wall which is used to support the pressure vessel.

The containment vessel is typically a concrete structure having an inner steel liner designed for containing the expected elevated pressure therein in the event of a nuclear accident, as well as preventing significant nuclear radiation released therefrom. The lower drywell being disposed below the pressure vessel typically includes one or more water sumps for collecting leaking water which is then conventionally removed therefrom by pumps. In the event of a severe accident in which the reactor core melts to form hot, molten core debris known as corium, the corium must be suitably contained within the containment vessel without appreciably damaging the containment vessel or the reactor pedestal. As the molten debris spreads over the floors of the containment vessel, the flow thereof will be fairly uniform in thickness if there are no obstructions and the floors are uniformly level. In this way, the molten corium may be allowed to uniformly cool and solidify. Since the molten corium includes molten reactor fuel which generates heat even after the reactor is shutdown, it may reliquify if suitable cooling thereof is not maintained.

For example, requirements for an advanced light water reactor include providing a suitable floor area beneath the pressure vessels for limiting the thickness of molten corium following an accident to promote the cooling thereof. However, since the water sumps are located below the pressure vessel, the molten corium may flow and collect therein at a substantially greater thickness than that over the remainder of the drywell floor, the increased thickness of the molten corium in the sumps decreases its ability to be cooled and increases the uncertainty of solidifying the molten corium, preventing it from reliquifying due to the heat being generated therein, and preventing it from interacting with the floor material thereby releasing radioactive material and noncondensable gases.

SUMMARY OF THE INVENTION

A shield for restricting molten corium from flowing into a water sump disposed in a floor of a containment vessel includes upper and lower walls which extend vertically upwardly and downwardly from the floor for laterally bounding the sump. The upper wall includes a plurality of laterally spaced apart flow channels extending horizontally therethrough, with each channel having a bottom disposed coextensively with the floor for channeling water therefrom into the sump. Each channel has a height and a length predeterminedly selected for allowing heat from the molten corium to dissipate through the upper and lower walls as it flows therethrough for solidifying the molten corium therein to prevent accumulation thereof in the sump.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
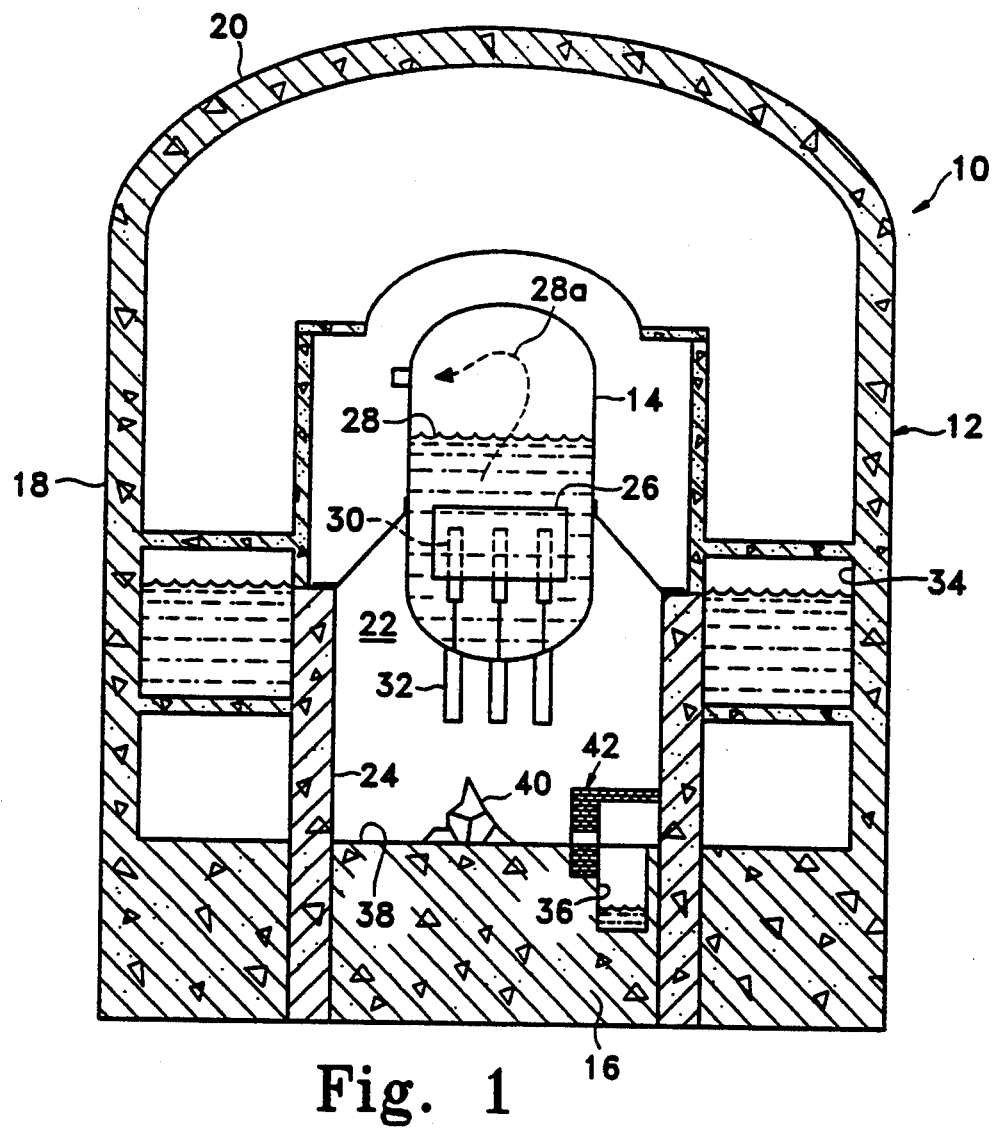
FIG. 1 is a schematic, elevational, partly sectional view of an exemplary nuclear reactor plant including a corium shield disposed in a lower drywell thereof below a reactor pressure vessel in accordance with one embodiment of the present invention.

Illustrated schematically in FIG. 1 is an exemplary nuclear reactor plant 10 including a containment vessel 12 in which is supported a reactor pressure vessel 14. The containment vessel 12 includes a conventional steel liner inside a concrete shell configured in the form of a thick base mat 16, an annular sidewall 18 extending upwardly therefrom, and a roof 20. Disposed inside the containment vessel 12 is a conventional drywell 22 surrounding the pressure vessel 14 and defined by conventional walls including an annular pedestal wall 24 extending downwardly into the base mat 16.

The pressure vessel 14 includes a conventional boiling water reactor core 26 having conventional nuclear fuel bundles therein (not shown). The pressure vessel 14 is partially filled with a recirculating coolant or water 28 which is heated by the core 26 during operation for generating steam 28a which is suitably channeled from the pressure vessel 14 for providing power to drive a steam turbine-generator for example (not shown). Reactivity in the core 26 is controlled by a plurality of conventional control rods 30 which are selectively inserted upwardly into the core 26 and withdrawn downwardly therefrom by a respective plurality of conventional control rod drives (CRDs) 32. The CRDs 32 extend downwardly below the lower head of the pressure vessel 14 into the lower portion of the drywell 22.

Also disposed inside the containment vessel 12 is a conventional annular wetwell or suppression pool 34 containing water therein which is used for various functions during the operation of the reactor. During normal operation of the reactor, water may leak from various sources and drop by gravity into the drywell 22 below the pressure vessel 14. In order to remove such leaking water, the base mat 16 includes one or more conventional water sumps or wells 36 disposed therein which extend downwardly from a drywell floor 38 at the top of the base mat 36. As the leaking water accumulates in the sump 36, conventional sump pumps (not shown) are used to remove the water therefrom as is conventionally known.

In the event of a severe accident in which the reactor core 26 becomes overheated and the nuclear fuel therein, which includes uranium, melts to form a liquid molten mass referred to herein as corium 40, the molten corium 40 will melt its way through the lower head of the pressure vessel 14, drop by gravity to the bottom of the drywell 22 as shown schematically in FIG. 1 and spread over the floor 38. It is desirable to spread the molten corium 40 uniformly over the floor 38 without undesirable locally thick regions which may prevent effective cooling thereof. However, if the molten corium 40 is allowed to flow into the sumps 36 and collect therein, its ability to be cooled becomes uncertain, which is undesirable. Accordingly, a corium shield 42 is provided for each of the water sumps 36 for restricting the molten corium 40 which may be released from the reactor core 26 following a severe accident from flowing into the sumps 36 and collecting therein.

Figure 3:
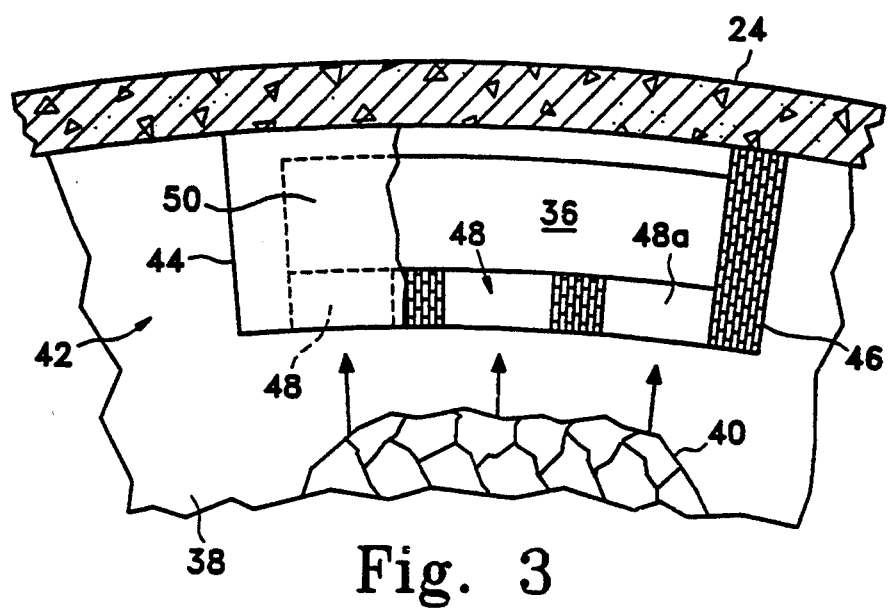
FIG. 3 is a top view of the corium shield illustrated in FIG. 2 and taken along line 3—3.
Figure 2:
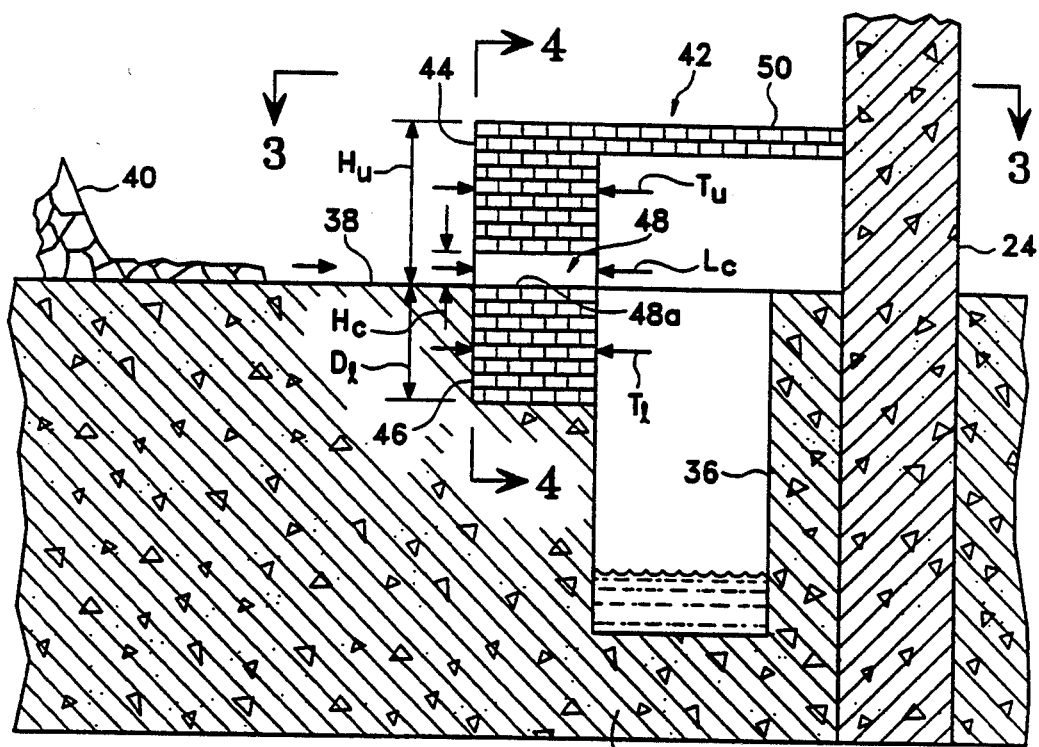
FIG. 2 is an enlarged, elevational, partly sectional view of the corium shield illustrated in FIG. 1 covering the water sump.

One of the sumps 36 and its respective corium shield 42 is illustrated with more particularity in FIG. 2. The shield 42 includes an upper wall 44 extending vertically upwardly from the drywell floor 38 and laterally bounding the sump 36 for blocking fluid flow into the sump 36 from the floor 38. A lower wall 46 extends vertically downwardly from the level of the floor 38 into the base mat 16 and coextensively with the upper wall 44 for collectively defining therewith an integral wall. The lower wall 46 is disposed between the floor 38 and the sump 36 for laterally bounding the sump 36. In the exemplary embodiments illustrated in FIGS. 2–4, the sump 36 is disposed adjacent to the inner diameter of the annular pedestal wall 24 for only an arcuate portion of the circumference thereof. The upper and lower walls 44, 46 are positioned between the floor 38 and the pedestal wall 24 for blocking direct access into the sump 36 of the molten corium 40 which falls by gravity from the bottom of the pressure vessel 14. The upper and lower walls 44, 46 as shown in FIG. 3 therefore provide a boundary on the three sides of the sump 36 which would otherwise be unprotected from flow of the molten corium 40 therein, with the radially outer boundary of the sump 36 being provided by the pedestal wall 24.

The upper wall 44 includes a plurality of laterally, or circumferentially spaced flow channels 48, with three being shown, extending horizontally therethrough from the floor 38 to the sump 36. Each channel 48 includes a preferably flat bottom 48a, as shown in FIG. 2 for example, which is disposed coextensively or substantially level with the floor 38 for channeling any leaking water from the floor 38 through the upper wall 44 and into the sump 36, wherein it collects, and may be conventionally removed as desired. The total flow area of the several channels 48 is selected to ensure that any leaking water flowing over the floor 38 during normal operation of the reactor can flow through the several channels 48 into the sump 36 without excessive restriction which could lead to pool formation thereof on the floor 38 in the lower drywell 22.

In accordance with one object of the present invention, each channel 48 has a vertical height $H_c$ and a horizontal length $L_c$ through the upper wall 44 which are selected for allowing heat from the molten corium 40 to dissipate through the upper and lower walls 44, 46 as it flows therethrough by gravity for solidifying or freezing the molten corium 40 therein to form a solid plug following a severe accident in which the molten corium 40 is created. In this way, the corium shield 42 provides the flow channels 48 for channeling leaking water into the sump 36 for normal operation of the reactor, but following a severe accident in which the molten corium 40 is created, the upper and lower walls 44, 46 prevent flow of the molten corium 40 into the sump 36, with the channels 48 promoting solidification of the molten corium 40 therein to block any further flow thereof. In this way, the molten corium 40 may form a layer of fairly uniform thickness across the drywell floor 38 and will not collect within the sumps 36 with an undesirable greater thickness.

Figure 4:
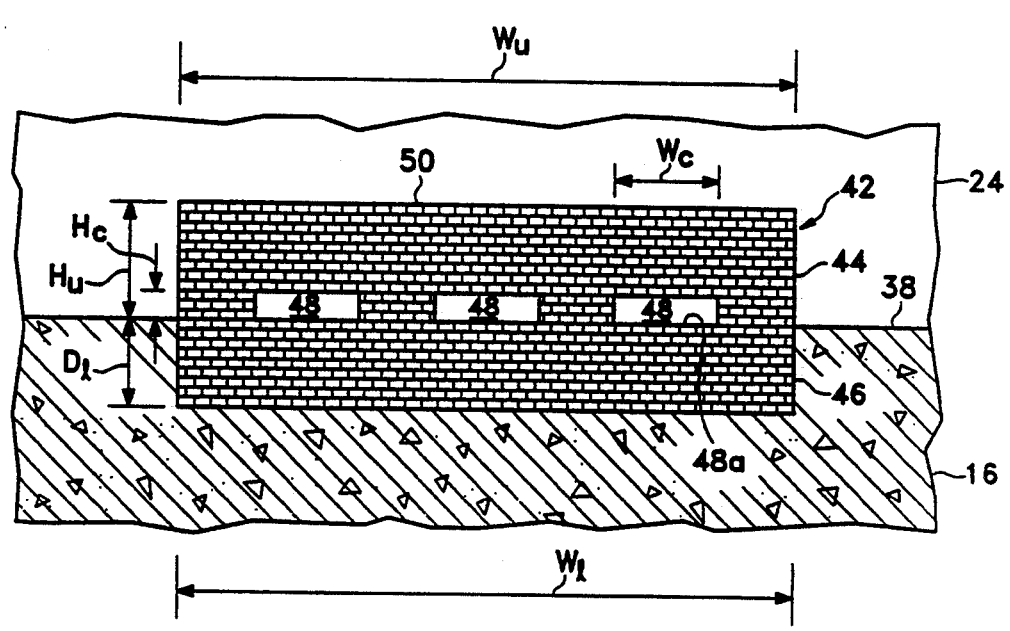
FIG. 4 is an elevational, partly sectional view of the corium shield illustrated in FIG. 3 and taken along line 4—4.

As shown in FIGS. 2 and 4, the upper wall 44 has a vertical height $H_u$ from the floor 38, and a horizontal thickness $T_u$ between the floor 38 and the sump 36 which is equal to the channel length $L_c$ in this exemplary embodiment. The height $H_u$ of the upper wall 44 is preselected to prevent the corium 40 from flowing thereover following the accident, and is also selected to ensure long term corium 40 solidification. Since the molten corium 40 includes nuclear fuel which continues to generate heat, the height $H_u$ and the thickness $T_u$ of the upper wall 44 must also be selected to limit thermal insulation above the channels 48 to prevent reliquification of the corium solidified in the channels 48. If the upper wall 44 is too high or too thick, heat conduction from the corium 40 within the channels 48 may be inadequate to prevent reliquification of the corium therein, which would then spill into the sump 36.

Similarly, the lower wall 46 has a vertical height or depth $D_1$ below the level of the floor 38, and a horizontal thickness $T_1$ between the floor 38 and the sump 36 which is also equal to the channel length $L_c$ in this exemplary embodiment. The depth $D_1$ and the thickness $T_1$ of the lower wall 46 are also preselected to have optimal values to limit thermal insulation below the channels 48 to prevent reliquification of the corium solidified in the channels 48. The lower wall 46 must provide suitable heat conduction from the flow channels 48 to initially solidify the molten corium 40 therein and prevent its reliquification, and also preferably thermally insulate the base mat 16 near the drywell floor 38 to reduce or prevent ablation of the concrete adjacent to the lower wall 46.

In the exemplary embodiment illustrated in the Figures, the corium shield 42 further includes a roof 50 suitably disposed on the upper wall 44 and extending to the pedestal wall 24 above the sump 36 for preventing the molten corium 40 from falling by gravity directly into the sump 36. The corium shield 42 may have various configurations and be formed of various suitable materials, and in the exemplary embodiment illustrated in the Figures, the upper and lower walls 44, 46 and the roof 50 are configured as inter-layered bricks. The corium shield 42 using bricks may be constructed in a conventional fashion with suitable supporting frames being disposed at the top of the channel 48 and bridging the top of the sump 36 for supporting the bricks thereon. The bricks may be conventional magnesite refractory bricks or may be formed of conventional alumina, and may also be concrete or suitable metals having the capability to provide an effective shield for the molten corium 40 and allow solidification thereof in the flow channels 48.

In a preferred embodiment, the upper and lower walls 44, 46 are formed of a material having a melting temperature greater than a predetermined interface temperature between the molten corium 40 and the walls 44, 46 where contact is initially made. At this contact boundary, the temperature of the molten corium 40 will be reduced due to thermal dissipation into the walls 44, 46, and, therefore, the melting temperature of the bricks may be suitably lower than would otherwise be required. Such a material includes for example magnesite or alumina.

As illustrated in FIG. 4, the upper wall 44 has a horizontal width $W_u$, which is equal to the horizontal width $W_l$ of the coextensive lower wall 46, and each of the channels 48 has a horizontal width $W_c$. The widths of the upper and lower walls 44, 46 may be any suitable width as desired for confining the sump 36 therein. And, the width $W_c$ of the channels 48 may also be selected as desired, for example, to ensure suitable flow area for water flow therethrough. The particular width $W_c$ of the channels 48 is not a significant factor in obtaining solidification of the molten corium 40 in the channels 48 since the heat transfer of the molten corium 40 into the upper and lower walls 44, 46 is primarily a one-dimensional (i.e. vertical) effect with the width $W_c$ dimension being an insignificant factor. In one exemplary embodiment analyzed wherein the corium shield 42 is formed of magnesite refractory bricks, the channel height $H_c$ is about 1 cm, the height $H_u$ and the depth $D_l$ of the upper and lower walls 44, 46 are about 0.4 meter, and the thickness, i.e. $T_u$ and $T_l$, of the walls 44, 46 is about 1 meter, with the length $L_c$ also being 1 meter. The width $W_c$ of the channel 48 may have any suitable value.

Figure 5:
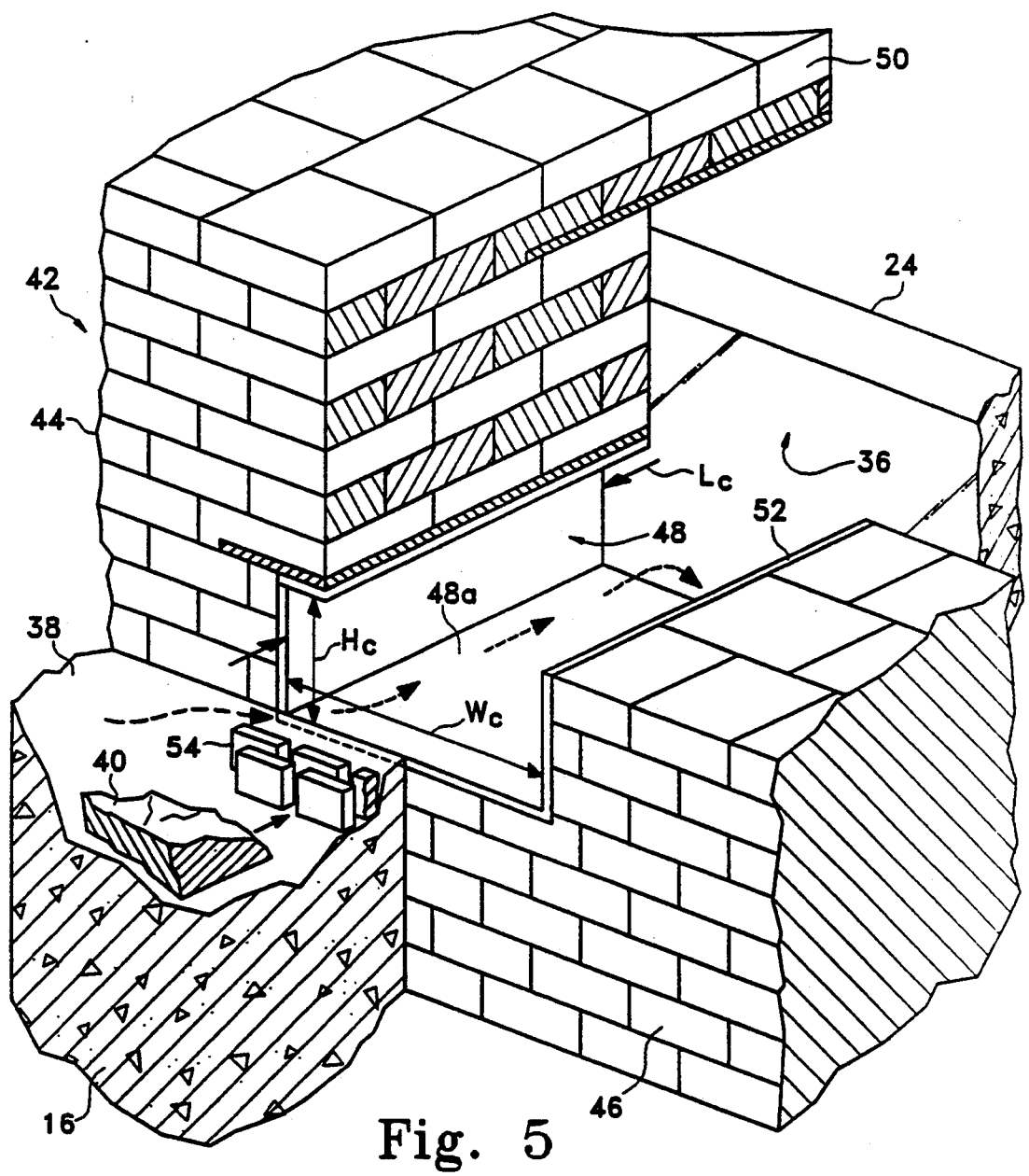
FIG. 5 is a perspective, partly sectional view of the corium shield illustrated in FIGS. 1-4 showing an exemplary flow channel extending horizontally therethrough.

Illustrated in FIG. 5 is an additional embodiment of the flow channel 48 which may further include a liner 52 covering all four inner surfaces of the flow channel 48 for preventing initial direct contact of the molten corium 40 therewith. The liner 52 is formed of a suitable material effective for forming eutectics or alloys with the molten corium 40. Eutectic alloys have lower melting points than the original molten corium 40 which will therefore reduce the required melting temperature of the material forming the shield walls 44, 46. An example of a suitable material for the liner 52 includes lead oxide glass.

Also illustrated in FIG. 5 are a plurality of flow inhibitors 54 in the form of staggered blocks disposed on the drywell floor 38 adjacent to the entrances of the flow channels 48 which block direct line-of-sight access therein for reducing flow velocity of the molten corium 40 into the channels 48. The molten corium 40 as indicated by the solid arrow will meet the flow inhibitors 54 and will be slowed in velocity as it flows around and between the inhibitors 54 before entering the flow channel 48. Water, in contrast, as indicated by the dashed arrows, will readily flow between and around the flow inhibitors 54 for collection within the sump 36. By reducing the velocity of the corium 40, the shield walls 44, 46 may be made thinner since the required time for freezing or solidifying the molten corium 40 will be thereby reduced.

Figure 6:
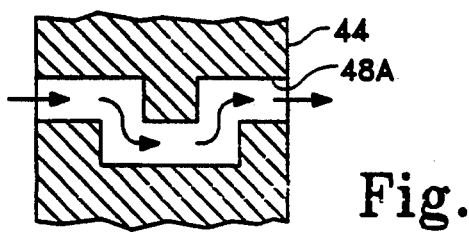
FIG. 6 is a top, partly sectional view of a serpentine flow channel through the corium shield in accordance with another embodiment of the present invention.

In the several exemplary embodiments of the flow channels 48 disclosed above, the channels 48 are straight and have rectangular cross sections, but in alternate embodiments the channels 48 may have any suitable cross section including circular, for example, and instead of being straight through the wall 44 may have a contorted path as shown by the exemplary serpentine flow channel 48A through the upper wall 44 in FIG. 6. In this way, the non-straight flow channels 48 may be used to slow the advancing molten corium 40 and lead to faster solidification thereof which therefore allows the shield walls 44, 46 to be additionally reduced in thickness.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A shield for restricting flow of molten corium released from a nuclear reactor core disposed in a reactor pressure vessel inside a containment vessel so that said molten corium does not flow into a water sump disposed in a floor of the containment vessel, comprising:
   an upper wall extending vertically upwardly from said floor and laterally bounding said sump for blocking fluid flow into said sump from said floor; and
   a lower wall extending vertically downwardly from said floor and coextensively with said upper wall, and laterally bounding said sump;
   wherein said upper wall has a plurality of laterally spaced flow channels extending horizontally therethrough, each channel having a bottom disposed coextensively with said floor for channeling water therefrom through said upper wall into said sump, and each channel having a height and a length selected for allowing heat from said molten corium to dissipate into said upper and lower walls upon flow of said molten corium through said channel so that said molten corium is solidified therein.

2. A corium shield according to claim 1 wherein said upper wall has a height from said floor and a thickness having maximum values selected to limit thermal insulation above said channels to prevent reliquification of said corium solidified in said channels.

3. A corium shield according to claim 1 wherein said lower wall has a depth below said floor and a thickness having maximum values selected to limit thermal insulation below said channels to prevent reliquification of said corium solidified in said channels.

4. A corium shield according to claim 1 wherein said upper and lower walls are formed of a material having a melting temperature greater than a predetermined interface temperature between said molten corium and said walls.

5. A corium shield according to claim 1 wherein said upper and lower walls are configured as interlayered bricks.

6. A corium shield according to claim 1 further comprising a roof disposed on said upper wall and above said sump for preventing flow of said molten corium therethrough into said sump.

7. A corium shield according to claim 1 further comprising a liner covering each of said channels for preventing direct contact of said molten corium therewith, said liner being formed of a material effective for forming eutectics with said molten corium.

8. A corium shield according to claim 1 further comprising a plurality of flow inhibitors disposed on said floor adjacent to the entrances of said channels for reducing a flow velocity of said molten corium into said channels.

9. A corium shield according to claim 1 wherein said flow channels are straight through said upper wall.

10. A corium shield according to claim 1 wherein said flow channels are serpentine through said upper wall for reducing a flow velocity of said molten corium therethrough.

11. A corium shield for restricting flow of molten corium released from a nuclear reactor core disposed in a reactor pressure vessel inside a containment vessel so that said molten corium does not flow into a water sump disposed in a floor of the containment vessel, comprising:

an upper wall extending vertically upwardly from said floor and laterally bounding said sump for blocking fluid flow into said sump from said floor; and a lower wall extending vertically downwardly from said floor and coextensively with said upper wall, and laterally bounding said sump;

wherein said upper wall has a flow channel extending horizontally therethrough, said channel having a bottom disposed coextensively with said floor for channeling water therefrom through said upper wall into said sump, and said channel having a height and a length selected for allowing heat from said molten corium to dissipate into said upper and lower walls upon flow of said molten corium through said channel so that said molten corium is solidified therein.

12. The corium shield according to claim 11, wherein each of said upper and lower walls has a vertical height such that the thermal insulation effect of said respective wall is not sufficient to cause reliquification of corium solidified in said channel.

13. The corium shield according to claim 11, wherein said upper and lower walls are made of a material having a melting temperature greater than a predetermined interface temperature between said molten corium and said walls.

14. The corium shield according to claim 11, wherein said upper and lower walls are configured as interlayered bricks.

15. The corium shield according to claim 11, further comprising a roof disposed on said upper wall and above said sump for preventing flow of said molten corium therethrough into said sump.

16. The corium shield according to claim 11, further comprising a liner covering said channel for preventing direct contact of said molten corium therewith, said liner being made of a material effective for forming eutectics with said molten corium.

17. The corium shield according to claim 11, further comprising a flow inhibitor disposed on said floor adjacent to the entrance of said channel for impeding a flow of said molten corium into said channel.

18. The corium shield according to claim 11, wherein said flow channels follow a serpentine path through said upper wall for impeding a flow of said molten corium into said channel.

19. A corium shield for restricting flow of molten corium released from a nuclear reactor core disposed in a reactor pressure vessel inside a containment vessel so that said molten corium does not flow into a water sump disposed in a floor of the containment vessel, comprising an upper wall extending vertically upwardly from said floor and laterally bounding said sump for blocking fluid flow into said sump from said floor, wherein said upper wall has a flow channel extending horizontally therethrough, said channel having a bottom disposed coextensively with said floor for channeling water therefrom through said upper wall into said sump, and said channel having a height and a length selected for allowing heat from said molten corium to dissipate upon flow of said molten corium through said channel so that said molten corium is solidified therein.

20. The corium shield according to claim 19, further comprising a liner covering said channel for preventing direct contact of said molten corium therewith, said liner being made of a material effective for forming eutectics with said molten corium.

* * * * *